United States Patent Office 2,857,377
Patented Oct. 21, 1958

2,857,377

AMYLACEOUS ESTERS OF SULFAMIC ACID

Irving Martin, North Plainfield, and Otto B. Wurzburg, Oldwick, N. J., assignors to National Starch Products Inc., New York, N. Y., a corporation of New York No Drawing. Application May 11, 1956
Serial No. 584,179

6 Claims. (Cl. 260—233.5)

This invention relates to a new method for making the sulfate esters of amylaceous products. More specifically, it relates to an improved method for making starch sulfates, and to the improved products thus obtained. An object of this invention is to obtain starch derivatives whose aqueous dispersions will be characterized by improved clarity and stability (i. e. resistance to gelling and retrogradation upon standing). A further object is to devise a process whereby the starch will not be gelatinized; that is, whereby the discrete granules of the starch are not destroyed and where the internal organization of the complex starch granule is retained, as evidenced by tests that will subsequently be described.

We have discovered that starch derivatives of the above-described type may be produced by a simple, dry process, involving no substantial gelatinization of the starch. According to our invention, relatively dry starch is heated in intimate admixture with a relatively non-volatile amide, such as urea or acetamide, and sulfamic acid. A more detailed description follows.

By "starch" we mean to include starches of any source, including corn, waxy maize, tapioca, sago, wheat, rice and potato. The starch used as the raw material in our process may be in its native, untreated state or it may have been subjected to preliminary treatment, by heat or chemicals of the type commonly used to produce so-called thin-boiling, fluidity, oxidized, esterified, etherified or similarly modified starches, provided that the modified starch is water-dispersible and has not been so highly substituted as to leave only a negligible number of free hydroxyl groups.

As equivalents of the urea or acetamide for the purpose of our invention, we include any water-soluble, non-volatile amide, such for example as dicyandiamide, biuret, formamide and thiourea. These amides tend to neutralize the acid and thus reduce the amount of degradation that may occur during the reaction, as well as appearing to act as swelling agents for the amylaceous substance and as catalysts for the esterification. The amide should be relatively non-volatile, by which we mean that it should have a boiling point above approximately 115° C. Volatile amides are not suitable for our process, since they tend to be lost during the necessary heating operation.

Essentially, our process involves impregnating starch with the amide and sulfamic acid, and then subjecting it to heat in an open system or a vacuum. By-products, such for example as water and ammonia, may be formed during the reaction, and it is desirable that these be removed, in order to maintain the efficiency of the reaction. It is seen, therefore, that the use of a pressure chamber or other closed system, as would be necessary if a volatile amide were used, would not be indicated.

In admixing the starch with the amide and the sulfamic acid, it is important that the starch be as uniformly and thoroughly impregnated with the mixture as possible. To accomplish this, the relatively dry starch can either be sprayed with an aqueous solution of the amide and sulfamic acid, resulting in a product which is still relatively dry and friable, or the starch may be suspended in an aqueous solution of the amide and sulfamic acid, followed by filtration and drying of the filter cake. Prior to the spraying or impregnation, the starch may be in commercially dry form or it may be anhydrous.

Following the impregnation with the amide and sulfamic acid, the sprayed starch or filter cake, as the case may be, is subjected to heating. It is desirable that the impregnated starch, prior to heating at the reaction temperature of 100° C.–300° C., have a moisture content no greater than 50%, preferably no greater than 25%, and no less than about 5%, since high moisture content carries with it the danger of gelatinization of the starch during the subsequent reaction heating. The reduction in moisture content, if necessary, can be accomplished in any convenient manner. Thus, the impregnated starch may merely be allowed to stand at room temperature, over a desiccant if desired, or it may be heated, in an oven, or by hot air currents or other suitable means, at a temperature below that which will cause gelatinization, until the moisture content has been reduced to a point where gelatinization will not occur when the higher reaction temperatures are applied. The particular temperature and moisture content that will cause gelatinization will vary with the starch type used, the particular amide, the amount and relative ratio of amide and sulfamic acid, the efficiency of moisture removal in the reactor, and other factors. However, gelatinization is a phenomenon so well known and understood in the starch art that the practitioner will have no difficulty in ascertaining and providing the conditions that will avoid gelatinization. In many cases, we have found that instead of considering the pre-drying or pre-heating as a separate step, we can place the high-moisture impregnated starch directly in the reactor vessel, and raise the heat so slowly that enough moisture is driven off, without gelatinization of the starch, so that when the reaction temperatures are reached there will no longer be any danger of gelatinization. Thus, it will be seen in Example III, below, that we heated the impregnated starch so slowly that it did not reach 304° F. until after eight hours of agitation.

The reaction may take place in any suitable vessel, as for example a steam or oil jacketed blender, a forced draft oven, a convection oven or a vacuum oven. There should be means for allowing the escape of any volatile products formed during the reaction (e. g., water vapor and ammonia).

Remembering that the impregnated starch (after reducing the moisture content to a non-gelatinizing amount) must be heated at a temperature within the range 100° C. to 300° C., the particular period of heating will vary, depending upon a number of factors. These include the particular temperature used, the types and proportions of reagents, and the ratio of amide to sulfamic acid. Since the object of the reaction is to produce a starch derivative characterized by improved clarity and stability of its aqueous dispersions, the reaction may be considered complete, for any particular starch-amide-sulfamic acid system, when the desired characteristics have been attained. As has been explained, it is impossible to specify one definite heating period, since this is controlled by so many variable factors. Therefore, it is desirable that samples be withdrawn at intervals during the heating, and heating is stopped when the desired properties are apparent.

With regard to the proportions of reagents to be used, we have found that the aqueous solution of amide and sulfamic acid with which the starch is impregnated should preferably contain from approximately 5% to 45% of the amide, and from approximately 3% to 20% of sulfamic acid, both based on the anhydrous weight of the starch being impregnated. It should be remembered that when the starch is impregnated by suspending in a solution of the reagents, followed by filtration, a certain proportion of the reagents is lost in the filtrate, as contrasted to the method whereby the reagent solution is sprayed onto the starch. It follows, therefore, that when choosing to impregnate by the suspension method, one would ordinarily need to take into account the amount of reagent that will be removed in the filtrate. As has already been mentioned, we may use a raw starch or one which has already been modified, as for example by oxidation or acid hydrolysis, to produce a so-called thin-boiling or fluidity starch. Ordinarily, the more highly degraded the starch employed as a raw material, the smaller the amounts of amide, sulfamic acid and moisture that should be present in the reaction mass, in order to obtain an ungelatinized product. The higher amounts of reagents are more apt to produce a gelatinized starch. The precise maximum amounts of reagents, beyond which gelatinization will occur, will be affected by the other factors which have already been mentioned as influencing the tendency toward gelatinization.

The ratio of amide to sulfamic acid should preferably fall within the range 1:1 to 8:1. Increasing the ratio of amide to sulfamic acid tends to increase the viscosity of the final product; that is, a given quantity of the starch derivative dispersed in a given quantity of water will give a thicker solution. On the other hand, an excessive proportion of the amide tends to impair the solubility of the starch derivative. Higher amounts of the amide, furthermore, have a greater tendency to gelatinize the starch.

It should be noted that the words "solution" and "dispersion" are here used in the sense in which they are ordinarily applied in the starch art. When starch is heated in water past the gelatinization temperature, it disperses to form a homogeneous hydrated colloidal dispersion. Such dispersions may range in appearance from those which are almost completely clear and transparent to those which are translucent or even opaque. However, in all cases where there is such a hydrated colloidal dispersion, the starch remains in the dispersed state and does not settle, as would an insoluble or ungelatinized starch. Such dispersions of starch are sometimes (though not quite accurately) called "solutions."

The final product of our invention, prior to dispersion in water, is still an essentially ungelatinized product, wherein the starch derivative exists in the form of the original discrete granules. This is indicated by the fact that when the granules of the starch derivative are examined microscopically under crossed Nicols, one observes the polarization crosses that are typical of ungelatinized starch granules (these crosses disappearing when starch is gelatinized). The fact that our product is essentially ungelatinized is most important. Thus, among other advantages, it means that the material is easily handled in the reactor (since gelatinization would tend to produce an unwieldy mass), and therefore the manufacturing process is simplified.

It is believed, although this invention does not depend, of course, upon any particular theory as to its mechanism, that one obtains by our process an esterification of the starch to produce the starch sulfate. It is believed that some of the sulfamic acid groups attached to the starch may be present in the free acid form, but some may be present in the form of various nitrogen derivatives, such for example as the ammonium salt or the diamide derivative. Various nitrogen compounds may be formed as by-products, such for example as biuret or cyanuric acid.

Depending upon the nature of the application to which they are to be put, the products may be used directly in the form in which they are obtained from the reaction chamber or they may be purified by any one of a number of known means.

The following examples, which are listed merely by way of illustration, but not in any sense as a restriction upon the scope of our invention, will further illustrate the embodiment of the process.

Unless otherwise indicated, all parts given are by weight.

Example I 20 parts of sulfamic acid and 80 parts of urea were dissolved in 560 parts of water. 400 parts of commercially dry, powdered corn starch were suspended in the solution and the slurry agitated 2 hours, after which it was filtered and the broken-up filter cake dried by a current of hot air. A sample of the resulting impregnated, dried starch was placed in a steam jacketed blender and heated 5 hours at approximately 266° F. A sample of the resulting derivative, when dialyzed 72 hours and analyzed for sulfur, indicated a sulfur content of 0.35.

When the derivative was cooked in 3 parts of water in a boiling water bath, a smooth, filmy sol was formed which remained relatively stable in viscosity after cooling. On the other hand, when a sample of the corresponding untreated corn starch was cooked in the same manner, it quickly reverted to a solid gel upon cooling.

Example II

Example I was repeated except that the impregnating solution contained 40 parts of sulfamic acid and 160 parts urea. A dialyzed sample of the derivative indicated a sulfur content of 0.56%. When the derivative was cooked in water as indicated in Example I, the dispersion was thinner and clearer than the product of Example I.

Example III 1600 parts of powdered corn starch were placed in a kettle equipped with an agitating device and an oil bath. The starch was agitated and sprayed with 128 parts of a solution containing 48 parts sulfamic acid and 192 parts urea. The starch was continuously agitated, and the temperature of the oil bath was gradually raised, at such a rate that the starch temperature was 304° F. after 8 hours of agitation. Dialysis of a sample of the derivative indicated 0.56% sulfur.

When cooked in 2 parts of water in a boiling water bath, and cooled overnight, the starch derivative was found to give a dispersion that was somewhat cohesive and was clearer and heavier than that formed by samples which had been withdrawn from the heating vessel between 4.5 and 8 hours.

Example IV

Powdered corn starch was treated as in Example I, except that the impregnating solution contained 20 parts of sulfamic acid and only 40 parts of urea. The derivative, when cooked in 3 parts of water, was much less viscous than the product of Example I, indicating that for a given amount of sulfamic acid and water, a lowering of the ratio of amide to sulfamic acid results in a lowering of the viscosity of the final product. A sample of the derivative was found to contain 0.30% sulfur.

Example V 10 parts of sulfamic acid and 40 parts of acetamide were dissolved in 140 parts of water. 100 parts of powdered corn starch were suspended in the solution and after agitating for 4 hours the slurry was filtered. The filter cake was broken up and dried at room temperature and the dried impregnated starch was then heated for 5 hours in an oven at 130° C. A sample of the resulting derivative contained 0.75% sulfur. When cooked in water, a dispersion was obtained which was notably clearer and more stable than a corresponding dispersion of the untreated corn starch.

Example VI 200 parts of sulfamic acid and 400 parts of urea were dissolved in 1400 parts of water. 1000 parts of corn starch were added and the mixture agitated 2 hours, whereupon it was filtered, the filter cake dried at temperatures below the gelatinization point of the starch. When the starch indicated a moisture content of 10%, it was powdered and heated in a dextrin cooker for 8 hours, the temperature being gradually increased to a maximum of 300° F. The resulting derivative, which had a fluidity of 75, was cooked in water at 20% concentration, forming a slightly gummy fluid which was particularly marked by its excellent stability and absence of any tendency to form a paste.

Example VII

In three different variations, Example I was repeated except that instead of corn starch there were used wheat starch, tapioca starch and waxy maize starch, respectively. Similarly improved derivatives were obtained, with particular reference to the improved clarity and stability of the cooked derivatives when compared to dispersons of the corresponding untreated starches.

Example VIII

In this example, we used as the raw material an "inhibited" corn starch. This is a starch which has been treated so as to inhibit the normal tendency of the granules to swell and burst when heated in water. In this case, we used a starch which had been treated, in an aqueous alkaline medium, with 0.1% epichlorhydrin (based on the dry weight of the starch) according to the method described in U. S. Patent 2,500,950. Using this starch as a raw material, Example I was repeated. The resulting derivative, when cooked in water, gave dispersions which were appreciably heavier than those obtained when untreated corn starch was used as the raw material. Aside from this increase in viscosity which is quite desirable for some applications, the product was characterized by the improved stability previously described.

Example IX

Example I was repeated, except that in place of ordinary corn starch, we used a starch which had previously been acid-converted to a degree known in the trade as "75 fluidity." Dispersions of the resulting derivative were darker and thinner than those obtained by the sulfation of untreated corn starch, but were characterized by improved stability against gelling.

Example X

Example I was repeated, but the impregnating solution consisted of 16 parts sulfamic acid and 128 parts urea in 300 parts water. The derivative produced aqueous dispersions notably clearer and more stable than those made from the corresponding untreated starch.

Example XI

Example I was repeated, except that only 20 parts of urea were used. When the derivative was cooked with 2 parts of water, it produced a thin, dark fluid. As previously indicated, reduction in the ratio of the amide to sulfamic acid results in thinner viscosities.

Example XII 100 parts of corn starch were mixed with 150 parts of an aqueous solution which contained 3% sulfamic acid and 12% urea. After agitating for 1 hour, the mixture was filtered and the filter cake broken up and spread on a tray. After drying at room temperature, the impregnated starch was then heated in an oven at 130° C. for 4 hours. The derivative thus obtained was heated in water to produce a relatively cohesive solution of notable clarity, viscosity-stability, tackiness and film-forming properties.

Example XIII

Although we have spoken herein of the use of sulfamic acid, it should be pointed out that the sulfamic acid may be used in the form of its salts. Thus, when we speak in the specification and claims of sulfamic acid, it is understood that we include the salts of sulfamic acid as equivalents thereof. This example illustrates the use of ammonium sulfamate in place of sulfamic acid.

100 parts of corn starch were mixed with 140 parts of water containing dissolved therein 40 parts of urea and 10 parts of ammonium sulfamate. The mixture was agitated for 4 hours at room temperature and filtered. The filter cake was dried at room temperature to 15% moisture and then heated in a forced-draft oven at 130° C. After 5 hours of heating, analysis indicated that the starch product contained 0.29% sulfur.

When the derivative was cooked in 8 parts of water, it produced a moderately heavy, slightly cohesive dispersion which was notably clearer and more viscosity-stable than a dispersion made with the corresponding untreated corn starch.

We have herein emphasized the importance of avoiding gelatinization of the starch during the reaction, since gelatinization of the starch would produce an unwieldy mass and immeasurably hinder the operation of the process. It follows, therefore, that the product of our reaction is in the form of the discrete, ungelatinized starch granules. The product may be sold in the dry, ungelatinized form, or it may be sold in the form of its aqueous dispersions. It may also be converted to a dry, gelatinized state by admixing the starch derivative with water and passing over heated revolving drums whereby the derivative is gelatinized and dried, or by first dispersing in water, with heat, and then drying. The thus dried product is comminuted and will form aqueous dispersions without the necessity of further heating. It must be pointed out that even if one does choose to gelatinize the finished starch sulfate, our process is still characterized by the important fact that gelatinization of the starch is avoided during the actual reaction between the starch and the reagents.

It has, of course, been known to convert or hydrolyze starches to the thin-boiling or dextrin form by heating with small amounts of acids. In those cases, the acid merely acts as a catalyst for the degradation of the starch, and no substantial part of the acid actually combines with the starch. Thus, the final product in such cases is still a starch which has been hydrolyzed or degraded rather than chemically substituted. Similarly, when starch is heated with urea or other amide, in the absence of sulfamic acid, there can naturally be no formation of a starch sulfate. Our invention comprises the discovery that when starch, in its original granule form, is treated with a mixture of sulfamic acid (or a salt thereof) and an amide and heated, sulfation of the starch results—this result being unobtainable with either reagent alone. Equally important is the discovery that this process can be carried out without gelatinizing the starch granules, therefore permitting the process to be run simply and efficiently. The result is a starch derivative remarkably improved over the corresponding untreated starch in many of its properties, including clarity and viscosity-stability of its aqueous dispersions as well as its improved film-forming and adhesive qualities.

The products of our invention are useful for many industrial applications, as for example, in the sizing and coating of paper, the sizing of textiles and the manufacture of adhesive compositions. Other uses will be apparent from the unique properties of these materials.

This application is a continuation-in-part of application Serial No. 512,585, filed June 1, 1955.

We claim:

1. The method of producing the sulfate ester of an amylaceous material in a substantially ungelatinized state which comprises impregnating an ungelatinized amylaceous material with sulfamic acid and an amide, and heating the mix at a moisture content of less than 50% and at temperatures in the approximate range of 100°

C. to 300° C. until a reaction between the amylaceous material and the sulfamic acid has occurred to produce the substantially ungelatinized amylaceous ester, the amount of moisture present during said heating being less than that which would permit gelatinization of the amylaceous material in the reaction mass, the amount of sulfamic acid used being between approximately 3% and approximately 20%, and the amount of amide being between approximately 5% and approximately 45%, both based on the anhydrous weight of the amylaceous material, and the ratio of amide to sulfamic acid being between 1:1 and 8:1.

2. The method of claim 1 in which the mixture of amylaceous material, sulfamic acid and amide is formed by spraying an aqueous solution of the acid and the amide onto the amylaceous material.

3. The method of claim 1 in which the mixture of amylaceous material, sulfamic acid and amide is formed by suspending the amylaceous material in an aqueous solution of the acid and the amide, and filtering the amylaceous material from said solution.

4. The method of claim 1 in which the mixing and impregnation is carried out to produce a moist mix and said moist mix is dried prior to the heating of the mix at the 100° C. to 300° C. temperatures.

5. The method of claim 1 in which the amylaceous material is starch.

6. The method of claim 1 in which the amide is selected from the class consisting of urea, acetamide, dicyandiamide, biuret, formamide and thiourea.

References Cited in the file of this patent

UNITED STATES PATENTS

| | | |
|---|---|---|
| 2,511,229 | Thomas | June 13, 1950 |
| 2,686,779 | Jones | Aug. 17, 1954 |
| 2,775,586 | Paschall | Dec. 25, 1956 |